(12) United States Patent
Yester et al.

(10) Patent No.: US 9,555,801 B2
(45) Date of Patent: Jan. 31, 2017

(54) ACTIVE STEERING SAFETY SYSTEM

(71) Applicants: DENSO International America, Inc., Southfield, MI (US); DENSO CORPORATION, Kariya-shi (JP)

(72) Inventors: John Yester, Birmingham, MI (US); Hans Riparip, Troy, MI (US); Bo Sun, Farmington Hills, MI (US); Hiroshi Hattori, Chita-gun (JP); Katsuhiko Akamatsu, West Bloomfield, MI (US)

(73) Assignees: Denso International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 85 days.

(21) Appl. No.: 14/532,614

(22) Filed: Nov. 4, 2014

(65) Prior Publication Data

US 2015/0251656 A1    Sep. 10, 2015

Related U.S. Application Data

(60) Provisional application No. 61/948,193, filed on Mar. 5, 2014.

(51) Int. Cl.
*B60W 30/09* (2012.01)
*B62D 15/02* (2006.01)
(Continued)

(52) U.S. Cl.
CPC .............. *B60W 30/09* (2013.01); *B60W 10/18* (2013.01); *B60W 10/20* (2013.01);
(Continued)

(58) Field of Classification Search
CPC ...... B60W 30/09; B60W 10/20; B60W 10/18; B60W 2550/308; B60W 2550/148; B60W 30/18163; B60W 30/08; B60W 30/12; B60W 30/18009; B60W 40/068; B60W 2550/30; B60W 2250/306–2250/308; B60W 2710/20; B60W 2710/207; G08G 1/166–1/167; B62D 15/25–15/0265; B60T 8/17557; B60T 2201/08; B60T 2201/083; B60T 2201/085; B60T 2201/087

(Continued)

(56) References Cited

U.S. PATENT DOCUMENTS 5,521,579 A    5/1996  Bernhard
6,388,565 B1 *  5/2002  Bernhard ............... B60Q 9/008
                                                    340/435

(Continued)

FOREIGN PATENT DOCUMENTS

JP    2005519807 A    7/2005
JP    2008222150 A    9/2008
(Continued)

OTHER PUBLICATIONS

Coefficient of friction.pdf (Coefficient of friction—definition of friction by The Free Dictionary, Jun. 24, 2016, http://www.thefreedictionary.com/coefficient+of+friction, pp. 1-2).*

(Continued)

*Primary Examiner* — Bao Long T Nguyen
(74) *Attorney, Agent, or Firm* — Harness, Dickey & Pierce, P.L.C.

(57) ABSTRACT

The present teachings provide for an active steering system for controlling a vehicle. The system can include at least one sensor and a control module. The at least one sensor can be configured to detect a leading obstacle. The control module can be configured to receive a signal from the at least one sensor, to determine a steering profile, and to execute a lane (Continued)

change maneuver based on the steering profile. The steering profile can include a plurality of steering angles and corresponding vehicle positions for maneuvering the vehicle from a current lane to an adjacent lane. The steering angles can be calculated to not increase the acceleration of the vehicle above an occupant comfort threshold value and to not cause the vehicle to cross an outer boundary of the adjacent lane.

11 Claims, 4 Drawing Sheets

(51) Int. Cl.
- *B60W 10/18* (2012.01)
- *B60W 10/20* (2006.01)
- *B60W 30/18* (2012.01)

(52) U.S. Cl.
CPC ... *B62D 15/0265* (2013.01); *B60W 30/18163* (2013.01); *B60W 2550/148* (2013.01); *B60W 2550/308* (2013.01)

(58) Field of Classification Search
USPC 701/41, 44, 48, 70, 519, 300, 301; 340/436, 340/435; 180/169, 274, 275, 280, 282
See application file for complete search history.

(56) References Cited

U.S. PATENT DOCUMENTS

| | | | |
|---|---|---|---|
| 6,889,786 B2 | 5/2005 | Watanabe et al. | |
| 7,016,783 B2 | 3/2006 | Hac et al. | |
| 7,363,140 B2 * | 4/2008 | Ewerhart | B60W 30/143 701/70 |
| 7,493,200 B2 | 2/2009 | Takahashi et al. | |
| 8,219,298 B2 * | 7/2012 | Nishira | B60K 31/0008 701/1 |
| 8,244,408 B2 * | 8/2012 | Lee | B60W 30/0953 180/169 |
| 9,092,987 B2 * | 7/2015 | Bone | G08G 1/167 |
| 9,229,453 B1 * | 1/2016 | Lee | G05D 1/0214 |
| 2003/0163239 A1 * | 8/2003 | Winner | B60K 31/0008 701/93 |
| 2004/0193374 A1 | 9/2004 | Hac et al. | |
| 2005/0155808 A1 | 7/2005 | Braeuchle et al. | |
| 2006/0261936 A1 * | 11/2006 | Widmann | B60Q 9/008 340/435 |
| 2007/0080825 A1 | 4/2007 | Shiller | |
| 2009/0192683 A1 | 7/2009 | Kondou et al. | |
| 2009/0319113 A1 * | 12/2009 | Lee | B62D 15/025 701/25 |
| 2010/0082195 A1 * | 4/2010 | Lee | B62D 15/025 701/25 |
| 2010/0228420 A1 * | 9/2010 | Lee | B62D 15/0255 701/26 |
| 2012/0265431 A1 | 10/2012 | Hayakawa et al. | |
| 2013/0338868 A1 * | 12/2013 | Essame | B60W 30/18163 701/23 |
| 2013/0345944 A1 * | 12/2013 | Kasiraj | B60W 30/16 701/96 |
| 2014/0074356 A1 * | 3/2014 | Bone | G08G 1/167 701/41 |
| 2014/0156164 A1 * | 6/2014 | Schuberth | B60W 30/143 701/96 |
| 2014/0207325 A1 * | 7/2014 | Mudalige | B62D 15/025 701/26 |
| 2015/0177007 A1 * | 6/2015 | Su | G01C 21/34 701/25 |

FOREIGN PATENT DOCUMENTS

| | | |
|---|---|---|
| JP | 2009137562 A | 6/2009 |
| JP | 2010083314 A | 4/2010 |
| WO | WO-2011077915 A1 | 6/2011 |

OTHER PUBLICATIONS

International Search Report and Written Opinion dated Jun. 2, 2015 issued in the corresponding PCT application No. PCT/JP2015/001131.

* cited by examiner

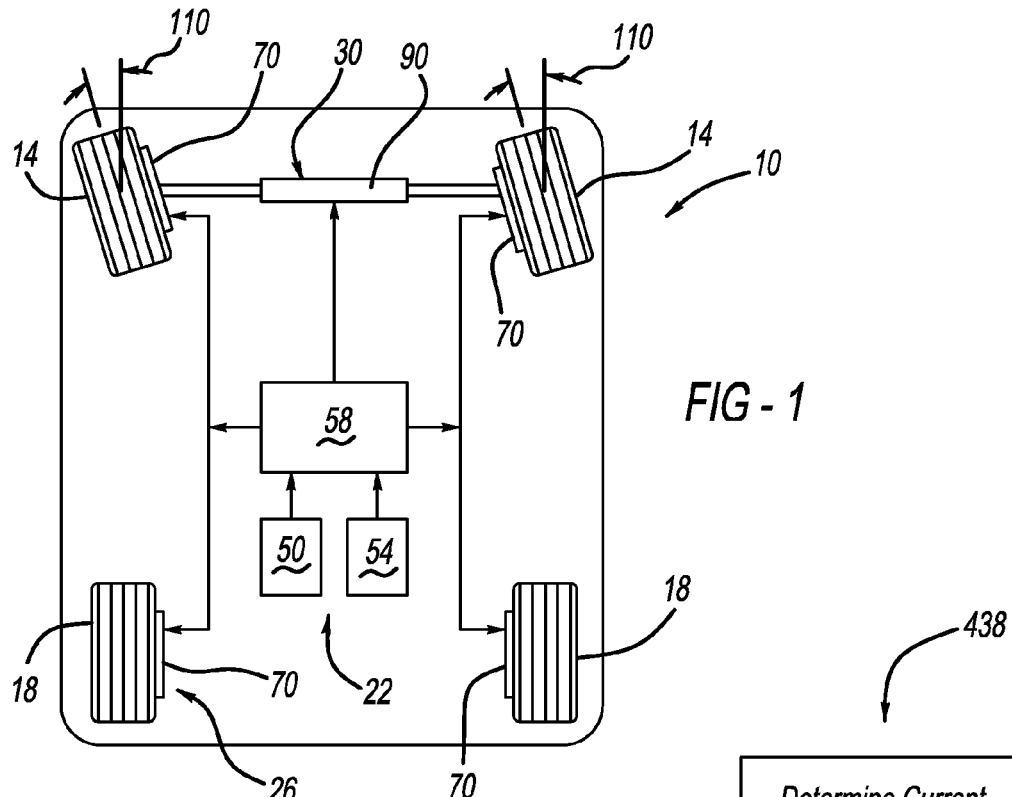

FIG - 1

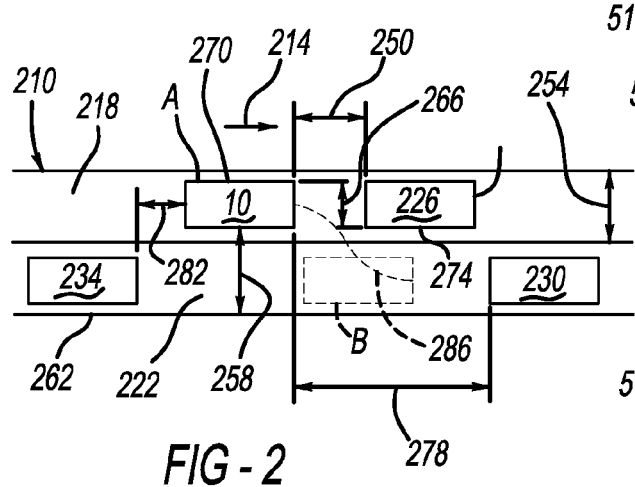

FIG - 2

```
                ┌──────────────────────┐
         510 ───│ Determine Current    │
                │ Lane Width 254       │
                └──────────┬───────────┘
                           │
                ┌──────────▼───────────┐
         514 ───│ Determine Current    │
                │ Lane Max Steer Rate  │
                └──────────┬───────────┘
                           │
                ┌──────────▼───────────┐
         518 ───│ Determine Lateral    │
                │ Distance Required 266│
                └──────────┬───────────┘
                           │
                ┌──────────▼───────────┐
         522 ───│ Calculate Adequate   │
                │ Distance             │
                └──────────────────────┘
```

FIG - 5

ACTIVE STEERING SAFETY SYSTEM

CROSS-REFERENCE TO RELATED APPLICATIONS

This application claims the benefit of U.S. Provisional Application No. 61/948,193, filed on Mar. 5, 2014. The entire disclosure of the above application is incorporated herein by reference.

FIELD

The present disclosure relates to a vehicle control system for improving time to avoid collision for active steering safety systems.

BACKGROUND

This section provides background information related to the present disclosure which is not necessarily prior art.

In automating the control of vehicle functions, an active steering system may allow the vehicle to have autonomy and authority independent of the driver. One area where this can create a safety benefit is by allowing the vehicle to override the driver's steering actions during critical situations where the probability of an accident with a leading vehicle is high, perhaps due to the lead vehicle suddenly stopping. In these situations, and with today's technology, today's vehicles can identify which vehicle is in front and its probable path and speed in the near term.

Some current technologies relate to actively steering a vehicle to avoid collisions. These technologies notably detect and account for a leading vehicle in front of the controlled vehicle. These technologies assume that the leading vehicle is the only obstacle and assume that there are adjacent lanes available to steer into without accounting for adjacent obstacles. These technologies do not account for whether an adjacent lane is actually available or the type or condition of an adjacent lane, such as the material or weather that can affect the coefficient of friction between the vehicle's wheels and the lane. These technologies also do not adequately account for the width of the adjacent lane and the possibility that abrupt steering can cause the vehicle to cross through the adjacent lane without remaining safely within the adjacent lane's boundaries.

SUMMARY

This section provides a general summary of the disclosure, and is not a comprehensive disclosure of its full scope or all of its features.

The present teachings provide for an active steering system for controlling a vehicle. The system can include at least one sensor and a control module. The at least one sensor can be configured to detect a leading obstacle. The control module can be configured to receive a signal from the at least one sensor, to determine a steering profile, and to execute a lane change maneuver based on the steering profile. The steering profile can include a plurality of steering angles and corresponding vehicle positions for maneuvering the vehicle from a current lane to an adjacent lane. The steering angles can be calculated to not increase the acceleration of the vehicle above an occupant comfort threshold value and to not cause the vehicle to cross an outer boundary of the adjacent lane.

The present teachings further provide for an active steering system for controlling a vehicle. The system can include at least one sensor and a control module. The at least one sensor can be configured to detect a leading obstacle and an adjacent obstacle. The control module can be configured to receive a signal from the at least one sensor, to calculate a steering profile, and to execute a lane change maneuver based on the steering profile. The steering profile can include a plurality of steering angles and corresponding vehicle positions for maneuvering the vehicle from a current lane to an adjacent lane. The steering angles can be calculated by the control module to not increase the acceleration of the vehicle above an occupant comfort threshold value and to not cause the vehicle to cross an outer boundary of the adjacent lane. The steering profile can be calculated based on a relative distance and velocity of the vehicle and the leading obstacle, a relative distance and velocity of the vehicle and the adjacent obstacle.

The present teachings further provide for a method for actively controlling a vehicle traveling in a current lane of a roadway. The method includes providing a vehicle with a control module and a plurality of sensors. The method includes that the sensors can send at least one signal to the control module. The method includes that the control module can determine if a lane change is required. The method includes that the control module can determine if an adjacent lane is available. The method includes that the control module can use occupant comfort and distance between the vehicle and an outer boundary of the adjacent lane to calculate a steering profile wherein the vehicle will not cross the outer boundary of the adjacent lane. The method includes that the control module can control a steering system of the vehicle to perform a lane change maneuver based on the steering profile.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is schematic view of a vehicle having a control system for actively controlling systems of a vehicle such as a steering and brake system;

FIG. 2 is a schematic view of an example roadway showing the vehicle of FIG. 1 and other vehicles on the roadway;

FIG. 5 is a flow chart of the step of determining an adequate distance to avoid a leading vehicle from the flow chart of FIG. 4.

Corresponding reference numerals indicate corresponding parts throughout the several views of the drawings.

DETAILED DESCRIPTION

Figure 3:
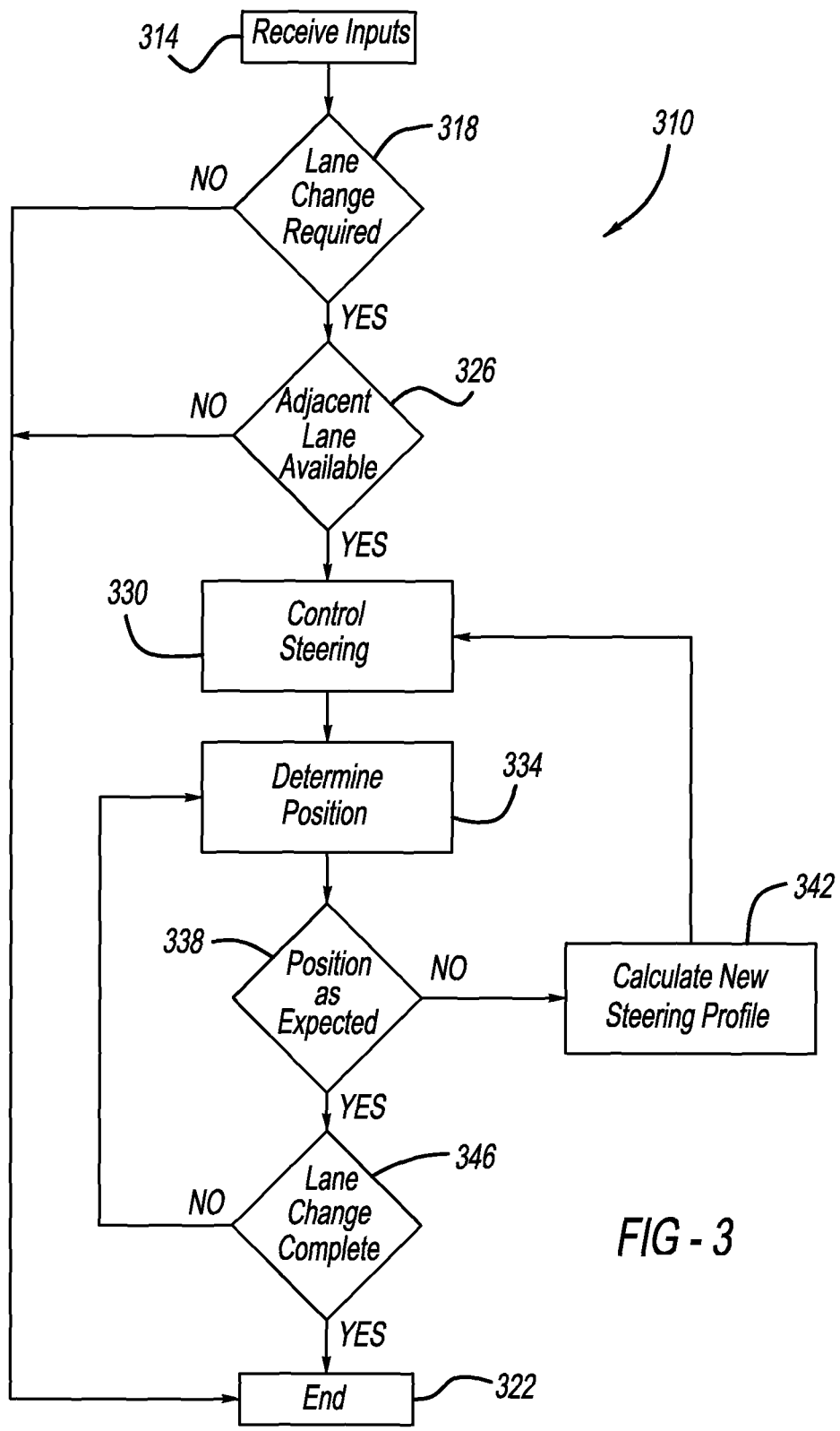
FIG. 3 is a flow chart for controlling the vehicle used by the control system of FIG. 1, including a step of determining if a lane change is required and a step of determining if an adjacent lane is available.

Example embodiments will now be described more fully with reference to the accompanying drawings.

With reference to FIG. 1, a vehicle 10 is schematically shown to include a pair of first wheels 14, a pair of second wheels 18, a control system 22, a brake system 26, and a steering system 30. The vehicle 10 can be any type of land based vehicle, such as an automobile, truck, bus, RV, military vehicle, agricultural vehicle, or commercial vehicle for example. The vehicle 10 can be an autonomous vehicle or a vehicle that is generally controlled by a human operator (not shown) but that the control system 22 is designed to supplement or override the operator's control of the vehicle 10. The vehicle's 10 drive power can be provided by any suitable means, such as an internal combustion engine, one or more electric motors, or a combination thereof for example.

The pair of first wheels 14 can be a pair of front wheels coupled to the steering system 30 and configured to steer the vehicle 10. The pair of first wheels 14 can also be drive wheels, such as in a front wheel, all-wheel, or four-wheel drive vehicle for example. The pair of second wheels 18 can be rear wheels and can be drive wheels, such as in a rear-wheel, all-wheel, or four-wheel drive vehicle, or can be non-drive wheels such as in a front-wheel drive vehicle.

The control system 22 can include a plurality of sensors 50, a database 54, and a control module 58. The plurality of sensors 50 can include sensors for detecting various parameters of the vehicle's 10 operation, including the vehicle's 10 geographic location, position on a driving surface, position in a lane, velocity, trajectory, acceleration, steering angle, brake application, engine speed, engine temperature, and brake temperature for example. The plurality of sensors 50 can also include sensors for detecting various parameters of the vehicle's 10 surroundings, including the type and size of driving surface the vehicle 10 is on, the existence of, type of, and size of driving surface(s) adjacent to the vehicle 10, the existence of, location of, velocity of, and acceleration of other vehicles or obstacles in the vehicle's 10 lane or in adjacent lanes, and weather conditions for example. Examples of such sensors include global positioning system ("GPS") sensors, proximity sensors, radar sensors, laser or light detection and ranging ("LIDAR") sensors, cameras, accelerometers, gyroscopes, inertial measurement units, rain or water sensors, and temperature sensors for example.

While other vehicles are referred to throughout, it is understood that the system can be configured to detect and respond to pedestrians, cyclists, barriers, trees, road signs, lamp posts, or other obstacles. Where adjacent lanes are referred to throughout, it is understood that an adjacent lane can be any drivable surface that can support a vehicle, such as driving lanes, road shoulders (paved or unpaved), bike lanes, sidewalks, or medians for example. While shown schematically within the vehicle 10, the sensors 50 can be appropriately located on the vehicle 10, depending on the type of sensor, such as on an exterior or interior of the vehicle 10, or within various components of the vehicle. For example, a proximity sensor can be located on an exterior of the vehicle, or a brake sensor can be located in the brake system 26 for example. Each of the sensors 50 can be configured to output a signal to be received and used by the control module 58 as will be described below.

The database 54 can be configured to store predetermined values for various controller inputs, such as maps, road data, speed limits, weather data, occupant comfort values, maximum steering or braking rates, and coefficients of friction for different driving surface types relative to the wheels 14, 18. The occupant comfort values can be values such as longitudinal or lateral acceleration that an occupant will find acceptable. Occupant comfort values can be adjusted based on the specific occupant, or based on other settings of the vehicle 10, such as a sport mode having higher thresholds or a comfort mode having lower thresholds for example. The values stored in the database 54 can be pre-programmed into the database 54 or can be updated periodically or continuously through wireless transmissions. The database 54 can be configured to output requested values to the control module 58 as will be described below. The database 54 can be any type of electronic data storage medium, such as a hard drive, solid state memory, flash drive, random access memory ("RAM"), or read only memory ("ROM"), for example. While the database 54 is described and illustrated as being located within the vehicle 10, it is appreciated that the database 54 can be located remotely from the vehicle 10 and can be accessed via wireless transmissions, such as being located on a remote server (not shown) or accessible via the internet for example.

The control module 58 can be configured to receive informational data in the form of electrical signals from the database 54 and one or more of the sensors 50. The control module 58 can be configured to output control signals to control the steering system 30 and the brake system 26 to actively control the vehicle 10 without input from the operator. The control module 58 can also be configured to control the engine speed of the vehicle's 10 engine (not shown) or other power plant.

The brake system 26 can be configured to resist rolling of one or more of the wheels 14, 18 in order to decelerate the vehicle 10 or to control the stability of the vehicle 10 to prevent traction loss. In the example provided, the brake system 26 includes a brake 70 on each of the four wheels 14, 18, though other configurations can be used. The brake system 26 can be mechanically or electrically controlled by an operator and can be configured to be automatically controlled by the control module 58. The brake system 26 can include any suitable type of braking device, such as friction discs or drums, regenerative braking, electromagnetic resistance, or air resistance for example.

The steering system 30 can include a steering mechanism 90 that can be configured to control a steering angle 110 of the pair of first wheels 14 to control the steering of the vehicle 10. The steering angle 110 can be the angle at which the pair of first wheels 14 are turned left or right relative to a straight ahead position. The steering system 30 can be configured to be mechanically or electronically controlled by the operator, and can be automatically controlled by the control module 58. The steering mechanism 90 can be any suitable type of steering mechanism, such as a rack and pinion mechanism, or a recirculating ball mechanism for example.

With additional reference to FIG. 2, a schematic view of an example roadway 210 on which the vehicle 10 can drive is shown. In the example provided, the vehicle 10 is traveling in the direction indicated by arrow 214. The vehicle 10 is illustrated in a first position A, where the vehicle 10 is driving in a current lane 218 of the roadway 210. The roadway 210 can also have an adjacent lane 222. The vehicle 10 is also illustrated, with dashed lines, in a second position B. In the second position B, the vehicle 10 is driving in the adjacent lane 222 after a lane change maneuver, as will be described below. A leading vehicle 226 can be present in the current lane 218. The leading vehicle 226 can be ahead of the vehicle 10. A leading adjacent vehicle 230 can be present in the adjacent lane 222 ahead of the vehicle 10. A trailing adjacent vehicle 234 can be present in the adjacent lane 222 behind the vehicle 10. It is understood that additional vehicles (not shown) can be on the roadway 210 and that the positions of the vehicles 226, 230, 234 relative to one another can be different than those shown in FIG. 2.

With additional reference to FIG. 3, a flow chart for a logic routine 310 that can be used by the control module 58 to autonomously control the vehicle 10 through a lane change maneuver is shown. The logic routine 310 can run continuously or be triggered to begin by the operator's input or by the detection of certain conditions by one or more of the sensors 50, such as speed and position of the vehicle 10 relative to the other vehicles 226, 230, 234 or obstacles, for example. At step 314, the control module 58 can receive inputs from the sensors 50. After receiving inputs from the sensors 50, the routine 310 can proceed to step 318. At step 318, the control module 58 can then determine if a lane change is required.

Figure 4:
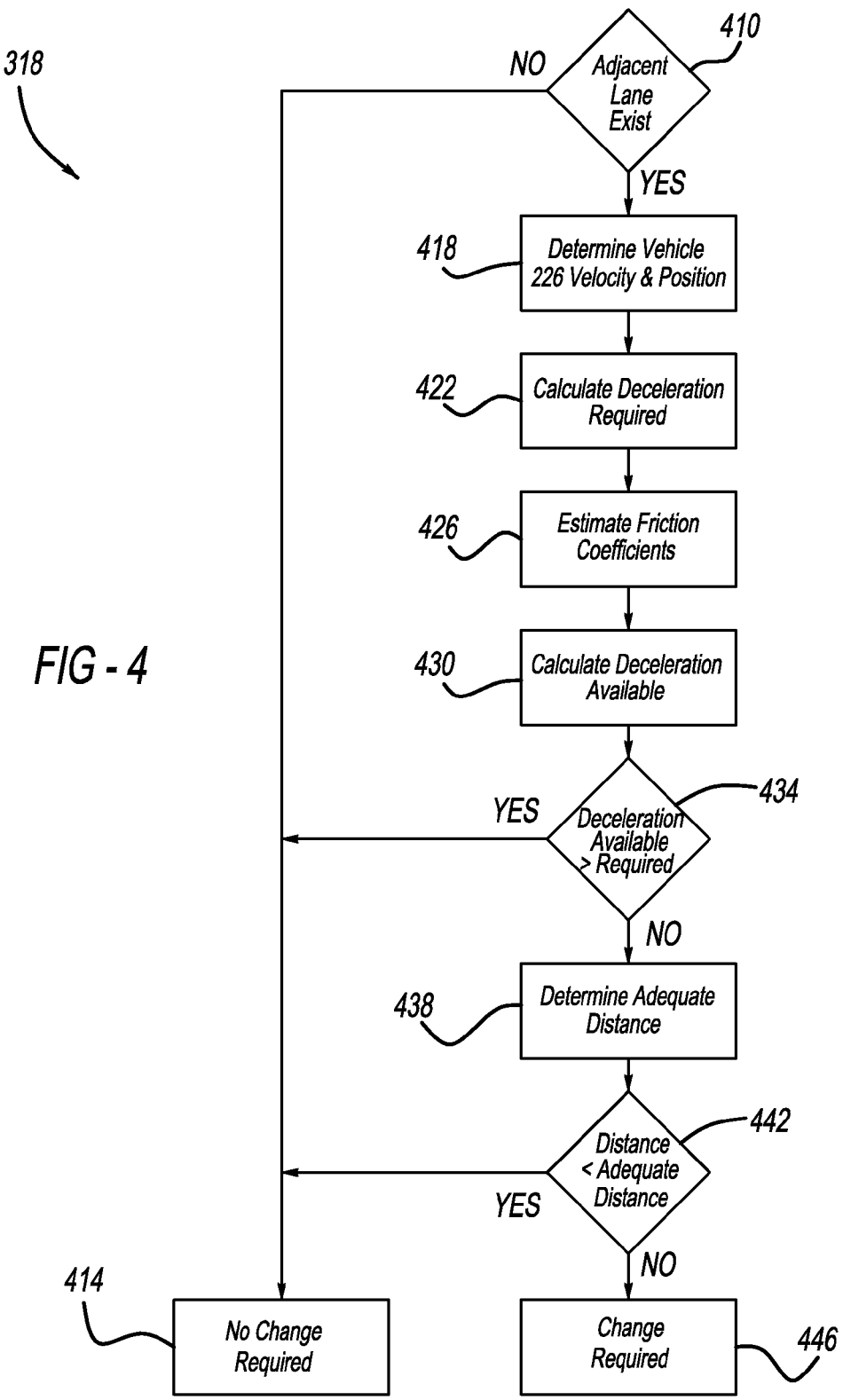
FIG. 4 is a flow chart of the step of determining if a lane change is required from the flow chart of FIG. 3, and including the step of determining an adequate distance to avoid a leading vehicle.

With additional reference to FIG. 4, step 318 of FIG. 3 of the logic routine 310, i.e. determining whether a lane change is required, is shown in more detail. At step 410, the control module 58 can analyze the signals received from the sensors 50 to determine if a drivable surface exists adjacent to the current lane 218, such as the adjacent lane 222. If the control module 58 determines that no drivable adjacent lane 222 exists, then the routine 310 can proceed to step 414 and output that no lane change is required, since no lane change can safely take place without the adjacent lane 222 present. The control module 58 can be configured to differentiate between lanes where traffic travels in the same direction 214 as the vehicle 10 and lanes where traffic travels in the opposite direction, i.e. oncoming traffic lanes (not shown). Depending on the configuration, the control module 58 can be configured to disregard oncoming traffic lanes as not driving surfaces for a lane change maneuver.

If the control module 58 determines that the adjacent lane 222 exists, then the routine 310 can proceed to step 418, where the control module 58 can determine the relative velocity of and distance to the leading vehicle 226 (or obstacle). The control module 58 can determine the relative velocity of and distance to the leading vehicle 226 based on input from the sensors 50. For example, a sensor 50 can determine the velocity of the vehicle 10 and a sensor 50 can determine the velocity of the leading vehicle 226. The control module 58 can subtract the velocity of the vehicle 10 from the velocity of the leading vehicle 226 to determine the relative velocity. A sensor 50 can determine a distance 250 (FIG. 2) to the leading vehicle 226 and send a signal indicative of that distance to the control module 58.

After determining the relative velocity of and distance 250 to the leading vehicle 226, the routine 310 can proceed to step 422. At step 422, the control module 58 can use the relative velocity of the vehicle 10 to the leading vehicle 226 and the distance 250 to the leading vehicle 226, determined in step 418, to calculate the stopping or deceleration rate of the vehicle 10 required to avoid a collision with the leading vehicle 226.

After calculating the deceleration rate required to avoid a collision with the leading vehicle 226, the routine 310 can proceed to step 426. At step 426, the control module 58 can estimate the coefficient of friction of the current lane 218 and of the adjacent lane 222. The control module 58 can estimate the coefficient of friction based on data stored in the database 54 and signals received by the sensors 50. For example, the database 54 can have different coefficients of friction stored for different road surfaces and conditions and the controller can use input from the sensors 50 or the database 54 to determine the road surface and condition of the current lane 218 and adjacent lane 222. For example, GPS or map data stored in the database 54 can include information about the road surface material in the current lane 218 and adjacent lane 222. Weather data stored in the database 54 can be used to modify the coefficient of friction value, such as when the road surface may be wet or icy for example. Alternatively or additionally, the sensors 50 can be configured to detect the type and condition of the road surface, such as with cameras, water sensors, or temperature sensors for example. It is understood that the coefficient of friction for the current lane 218 can be different from the coefficient of friction for the adjacent lane 222.

After estimating the coefficients of friction, the routine 310 can proceed to step 430. At step 430, the control module 58 can calculate the available stopping or deceleration rate. The available deceleration rate can be the rate at which the vehicle 10 can safely decelerate on the road surface of the current lane 218. The available deceleration rate can be calculated based on the velocity of the vehicle 10 and the coefficient of friction between the wheels 14, 18 and the road surface.

After calculating the available deceleration rate, the routine 310 can proceed to step 434. At step 434, the control module 58 can compare the available deceleration rate to the deceleration rate required to avoid collision with the leading vehicle 226. If the available deceleration rate is greater than the required deceleration rate, then the routine 310 can proceed to step 414 and output that no lane change is required, since the vehicle 10 can safely decelerate to avoid the collision.

If the control module 58 determines that the available deceleration rate is not greater than the required deceleration rate, the routine 310 can proceed to step 438. At step 438, the control module 58 can determine an adequate distance between the vehicle 10 and the leading vehicle 226 needed for avoiding the leading vehicle 226.

With additional reference to FIG. 5, step 438 of FIG. 4 of the logic routine 310, i.e. determining the adequate distance to avoid the leading vehicle 226, is shown in more detail. At step 510, the control module 58 can determine a width 254 (FIG. 2) of the current lane 218 and determine a lateral distance 258 (FIG. 2) to an outer boundary 262 (FIG. 2) of the adjacent lane 222. The outer boundary 262 can be the boundary of the adjacent lane 222 furthest from the current lane 218. The control module 58 can determine the width 254 of the current lane 218 based on input from the sensors 50 or stored data in the database 54. The lateral distance 258 to the outer boundary 262 of the adjacent lane 222 can be the distance the vehicle 10 would need to move laterally to reach the outer boundary 262 of the adjacent lane 222. The control module 58 can determine the lateral distance 258 to the outer boundary 262 of the adjacent lane 222 based on input from the sensors 50 or a combination of the input from the sensors 50 and information stored in the database 54.

After determining the width 254 of the current lane 218 and the lateral distance 258 to the outer boundary 262 of the adjacent lane 222, the routine 310 can proceed to step 514. At step 514, the control module 58 can determine the maximum steering rate for the current lane 218 and adjacent lane 222. The maximum steering rate can be the maximum rate at which the steering system 30 can change the steering angle 110 (FIG. 1) of the wheels 14 without losing traction. The maximum steering rate can depend on the velocity of the vehicle 10, the current steering angle 110, and the coefficient of friction between the wheels 14 and the road surface of the current lane 218 and adjacent lane 222. It is understood that the maximum steering rate of the current lane 218 can be different from the maximum steering rate of the adjacent lane 222.

After determining the maximum steering rates, the routine 310 can proceed to step 518. At step 518, the control module 58 can determine a lateral distance 266 (FIG. 2) that the vehicle 10 must move to avoid the leading vehicle 226. The control module 58 can determine the lateral distance 266 needed for the vehicle 10 to avoid the leading vehicle 226 by analyzing signals received from the sensors 50 that can sense the relative lateral position of the leading vehicle 226. The lateral distance 266 to avoid the leading vehicle 226 can be the distance from an outer perimeter 270 of the vehicle 10, which is away from the adjacent lane 222, to an inner perimeter 274 of the leading vehicle 226, which is proximate to the adjacent lane 222.

After determining the lateral distance 266 needed to avoid the leading vehicle 226, the routine 310 can proceed to step 522. At step 522, the control module 58 can calculate an adequate distance between the vehicle 10 and the leading vehicle 226, which is adequate in order to change lanes without exceeding the comfort requirements of the occupants, and without crossing the outer boundary 262 of the adjacent lane 222. The comfort requirements can be maximum acceleration values stored in the database 54 as discussed above.

After calculating the adequate distance to change lanes at step 522 of FIG. 5, the routine 310 can proceed to step 442 of FIG. 4. At step 442, the control module 58 can compare the distance 250 to the leading vehicle 226 with the adequate distance to avoid the leading vehicle 226 when changing lanes. If the distance 250 to the leading vehicle 226 is less than the adequate distance to avoid the leading vehicle 226 when changing lanes, then the routine 310 can proceed to step 414 and output that a lane change is not required, as there is inadequate room between the vehicle 10 and the leading vehicle 226 to perform a lane change maneuver within the comfort levels or without crossing the outer boundary 262 of the adjacent lane 222.

If the distance 250 to the leading vehicle 226 is not less than the adequate distance to avoid the leading vehicle 226 when changing lanes, then the routine 310 can proceed to step 446 and output that a lane change is required. In short, a lane change can be determined to be required if the adjacent lane 222 exists, the vehicle 10 cannot decelerate to otherwise avoid the leading vehicle 226, and the distance 250 between the vehicle 10 and the leading vehicle 226 is adequate to change lanes without crossing the outer boundary 262 of the adjacent lane 222 and without exceeding occupant comfort levels.

Returning to FIG. 3, if a lane change is not required as determined by step 414 and FIG. 4, then the routine 310 can proceed to step 322. At step 322, the routine 310 can end. Alternatively, step 322 can restart the routine 310 by returning to step 314. If a lane change is determined to be required, the routine 310 can proceed to step 326. In step 326, the control module 58 can determine if the adjacent lane 222 is actually available for the vehicle 10 to enter.

Figure 6:
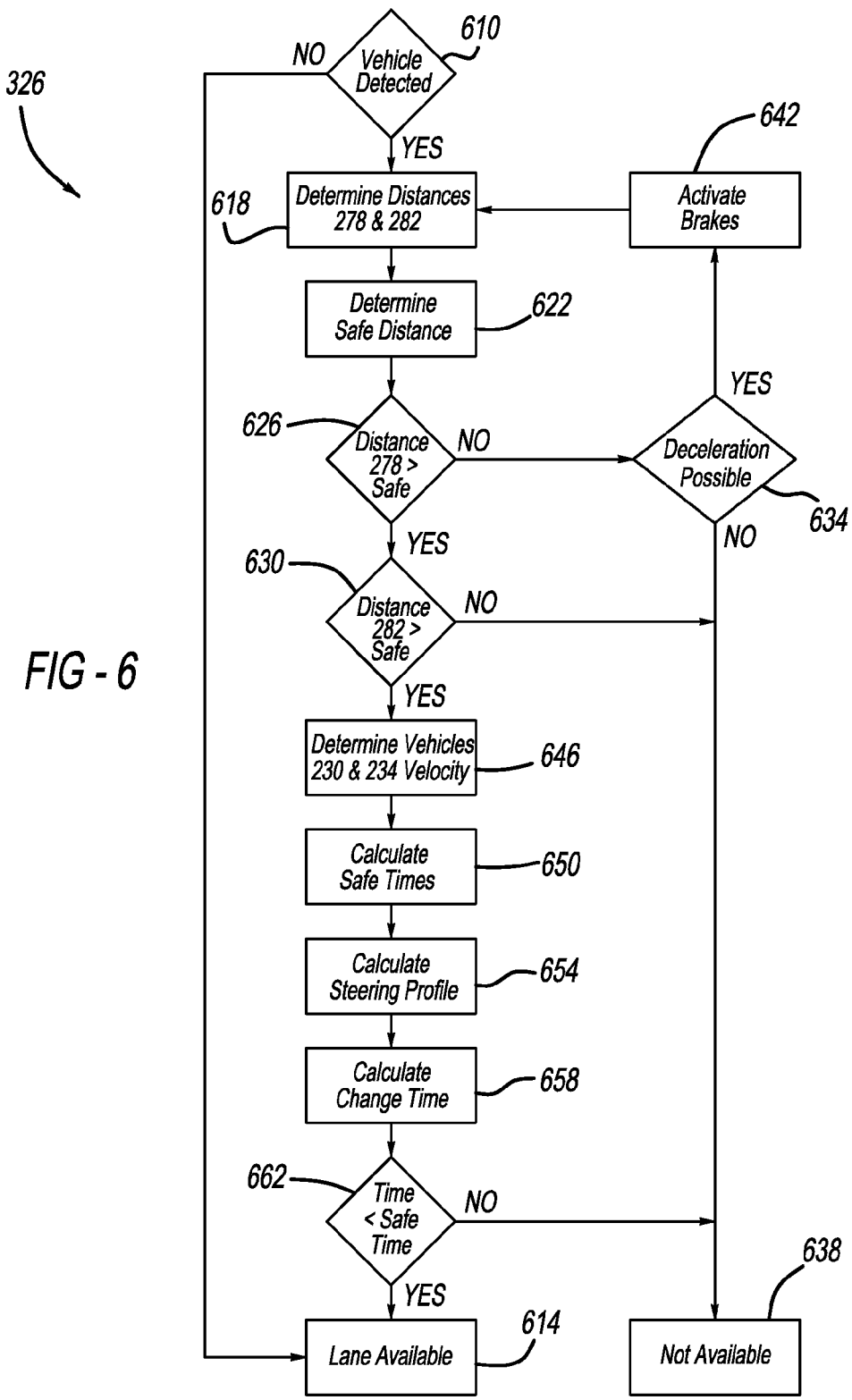
FIG. 6 is a flow chart of the step of determining if an adjacent lane is available from the flow chart of FIG. 3.

With additional reference to FIG. 6, step 326 of FIG. 3 of the logic routine 310, i.e. determining whether the adjacent lane 222 is available, is shown in more detail. At step 610, the control module 58 can check if any vehicles are detected in the adjacent lane 222, such as the leading adjacent vehicle 230 or the trailing adjacent vehicle 234, for example. Vehicles in the adjacent lane 222 can be detected by the sensors 50. If no vehicles are detected in the adjacent lane 222, then the routine 310 can proceed to step 614, and output that the adjacent lane is available.

If a vehicle is detected in the adjacent lane 222, then the routine 310 can proceed to step 618. At step 618, the control module 58 can determine the longitudinal distances between the vehicle 10 and any adjacent vehicles. In the example provided, the sensors 50 can detect a leading adjacent distance 278 (FIG. 2) between the vehicle 10 and the leading adjacent vehicle 230, and a trailing adjacent distance 282 (FIG. 2) between the vehicle 10 and the trailing adjacent vehicle 234.

After determining the leading adjacent distance 278 and trailing adjacent distance 282, the routine 310 can proceed to step 622. At step 622, the control module 58 can determine a safe leading distance and a safe trailing distance. The safe leading distance can be the minimum distance between the vehicle 10 and the leading adjacent vehicle 230 that can be allowed based on safety considerations. The safe trailing distance can be the minimum distance between the vehicle 10 and the trailing adjacent vehicle 234 that can be allowed based on safety considerations. The safety considerations can include occupant comfort values, velocity of the vehicle 10, velocity of the leading adjacent vehicle 230, the road type and conditions of the adjacent lane 222, and the coefficient of friction of the adjacent lane 222, for example. The safety consideration values can be stored in the database 54 or determined by sensors 50.

After determining the safe leading and trailing distances, the routine 310 can proceed to step 626. At step 626, the control module 58 can compare the leading adjacent distance 278 to the safe leading distance. It is understood that if there is no leading adjacent vehicle 230 within range of the sensors 50, then the routine 310 can skip step 626 and proceed to step 630.

If the leading adjacent distance 278 is not greater than the safe leading distance, then the routine 310 can proceed to step 634. At step 634, the control module 58 can determine if the vehicle's 10 speed can be safely reduced. If the vehicle's 10 speed cannot be safely reduced, then the routine 310 can proceed to step 638. The vehicle's 10 speed can be safely reduced if the control module 58 can safely apply the brakes 70 without losing traction. Other factors can be considered, such as if a vehicle (not shown) is following the vehicle 10 in the current lane at a distance such that reducing the vehicle's 10 speed would cause the vehicle 10 to be rear ended, for example. At step 638, the routine 310 can output that the adjacent lane 222 is not available, as the leading adjacent vehicle 230 is too close longitudinally to the vehicle 10 for the vehicle 10 to safely enter the adjacent lane 222.

If the vehicle 10 can safely reduce its speed, then the routine 310 can proceed to step 642. At step 642, the control module 58 can send a signal to the brake system 26 to activate the brakes 70 in order to decelerate the vehicle 10. The brake system 26 can activate the brakes 70 together or can activate individual ones of the brakes 70 separately. After the brake system 26 has reduced the velocity of the vehicle 10 a predetermined amount or the brakes 70 have been applied for a predetermined time period, then the routine 310 can proceed back to step 618 to re-determine the distances from the adjacent vehicles 230, 234.

Returning to step 626, if the control module 58 determines that the leading adjacent distance 278 is greater than the safe leading distance, then the routine 310 can proceed to step 630. At step 630, the control module 58 can compare the trailing adjacent distance 282 to the safe trailing distance. It is understood that if there is no trailing adjacent vehicle 234 within range of the sensors 50, then the routine 310 can skip step 630 and proceed to step 646.

If the trailing adjacent distance 282 is not greater than the safe trailing distance, then the routine 310 can proceed to step 638 to output that the adjacent lane 222 is not available, as the trailing adjacent vehicle 234 is too close longitudinally to the vehicle 10 for the vehicle 10 to safely enter the adjacent lane 222. If the trailing adjacent distance 282 is greater than the safe trailing distance, then the routine 310 can proceed to step 646.

At step 646, the control module 58 can determine the relative velocity of the leading adjacent vehicle 230 and the relative velocity of the trailing adjacent vehicle 234. The relative velocity of the leading adjacent vehicle 230 can be the velocity of the vehicle 10 subtracted from the velocity of the leading adjacent vehicle 230. The relative velocity of the trailing adjacent vehicle 234 can be the velocity of the vehicle 10 subtracted from the velocity of the trailing adjacent vehicle 234. The velocity of the leading adjacent vehicle 230 and of the trailing adjacent vehicle 234 can be determined by the sensors 50.

After the relative velocities of the leading and trailing adjacent vehicles 230, 234 are determined, the routine 310 can proceed to step 650. At step 650, the control module 58 can calculate the time that the leading adjacent distance 278 will remain greater than the safe leading distance, and the time that the trailing adjacent distance 282 will remain greater than the safe trailing distance. The control module can calculate these times based on the relative velocity of the leading adjacent vehicle 230 and the relative velocity of the trailing adjacent vehicle 234.

After calculating the time that the leading adjacent distance 278 will remain greater than the safe leading distance, and the time that the trailing adjacent distance 282 will remain greater than the safe trailing distance, the routine 310 can then proceed to step 654. At step 654, the control module 58 can calculate a steering profile 286 (FIG. 2). The steering profile 286 can include the steering angles 110 (FIG. 1) and vehicle positions that the vehicle 10 can use to change lanes from the current lane 218 to the adjacent lane 222 without crossing the adjacent lane's 222 outer boundary 262 and without exceeding the occupant comfort levels. The control module 58 can calculate more than one possible steering profile 286. For example, these steering profiles 286 can include a critical steering profile, a nominal steering profile, and a maximum comfort steering profile. The critical steering profile can be such that the occupant comfort values are the lowest. The maximum comfort steering profile can be such that the occupant comfort values are the highest. The nominal profile can be between the critical and maximum comfort profiles. The steering profiles can be stored in the database 54 or held in temporary storage.

After calculating the steering profile 286, the routine 310 can proceed to step 658. At step 658, the control module can calculate the time that completing the lane change will take based on the steering profile 286.

After calculating the time necessary to complete the lane change, the control module 58 can proceed to step 662. At step 662, the control module 58 can compare the time necessary to complete the lane change to the time that the leading adjacent distance 278 will remain greater than the safe leading distance and the time that the trailing adjacent distance 282 will remain greater than the safe trailing distance.

If the time necessary to complete the lane change is not less than the time that the leading adjacent distance 278 will remain greater than the safe leading distance, and the time necessary to complete the lane change is not less than the time that the trailing adjacent distance 282 will remain greater than the safe trailing distance, then the routine 310 can proceed to step 638, and output that the adjacent lane is not available, as the lane change maneuver cannot be completed before either the leading or trailing adjacent vehicle 230, 234 is too close to the vehicle 10.

If the time necessary to complete the lane change is less than the time that the leading adjacent distance 278 will remain greater than the safe leading distance, and the time necessary to complete the lane change is less than the time that the trailing adjacent distance 282 will remain greater than the safe trailing distance, then the routine 310 can proceed to step 614 and output that the adjacent lane is available, as the vehicle 10 can safely complete the lane change maneuver. In this way, the control module 58 can account for the future locations of the trailing adjacent vehicle 234 and the leading adjacent vehicle 230 when determining if the vehicle can change lanes safely. If there is a second adjacent lane (not shown), such as one on each side of the vehicle 10, the control module 58 can similarly check the availability of the second adjacent lane and choose the adjacent lane 222, if any, which allows for the steering profile 286 with the greatest margin of safety and comfort.

Returning to step 328 of FIG. 3, if the adjacent lane is not available, as determined by step 638 of FIG. 6, then the routine 310 can proceed to step 322 and end or restart as described above. If the adjacent lane is available, as determined by step 638 of FIG. 6, then the routine 310 can proceed to step 330. At step 330, the control module 58 can send a signal to the steering system 30 to control the steering system 30 to adjust the steering angle 110 in accordance with the steering profile 286 and begin changing lanes. It is understood that if multiple steering profiles 286 were calculated, then the control module 58 can choose an optimal one of the steering profiles 286 based on any number of factors including safety margins of error, or occupant comfort levels.

After the vehicle 10 has begun the lane change maneuver, the routine 310 can proceed to step 334. At step 334, the control module 58 can determine the vehicle's 10 position. The vehicle's 10 position relative to the current lane 218, outer boundary 262 of the adjacent lane 222, leading vehicle 226, leading adjacent vehicle 230 and trailing adjacent vehicle 234 can be determined by the sensors 50.

After determining the vehicle's 10 position, the routine 310 can proceed to step 338. At step 338, the control module 58 can compare the vehicle's 10 position to the expected position from the steering profile 286. If the vehicle's 10 position is not within a predetermined margin of error of the expected position from the steering profile 286, then the routine 310 can proceed to step 342.

At step 342, the control module 58 can calculate a new steering profile. The new steering profile can be similar to the steering profile 286, but can account for changes or differences between the actual vehicle position and the expected vehicle position. After calculating a new steering profile, the routine 310 can return to step 330 to continue changing lanes based on the new steering profile.

Returning to step 338, if the vehicle's 10 position is within the predetermined margin of error for the expected position from the steering profile 286 (or new steering profile), then the routine 310 can proceed to step 346. At step 346, the control module 58 can check if the lane change maneuver is complete. If the lane change maneuver is not complete, then the routine 310 can return to step 334 to re-determine the vehicle's 10 position. If the lane change maneuver is complete, then the routine 310 can proceed to step 322 and end, or restart as appropriate.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

What is claimed is:

1. An active steering system for controlling a vehicle, the system comprising:
    at least one sensor configured to detect a leading obstacle; and
    a control module configured to receive a signal from the at least one sensor, to determine a steering profile, and to execute a lane change maneuver based on the steering profile;
    wherein:
    the steering profile includes a plurality of steering angles and corresponding vehicle positions for maneuvering the vehicle from a current lane to an adjacent lane, the steering angles being calculated to not increase the acceleration of the vehicle above an occupant comfort threshold value and to not cause the vehicle to cross an outer boundary of the adjacent lane;
    the control module is configured to compare an available deceleration rate of the vehicle with a required deceleration rate of the vehicle that is required to avoid the leading obstacle;
    if the available deceleration rate of the vehicle is greater than the required deceleration rate of the vehicle, the control module determines that no lane change maneuver is required to avoid the leading obstacle;
    if the available deceleration rate of the vehicle is less than the required deceleration rate of the vehicle, the control module determines that the lane change maneuver is required to avoid the leading obstacle;
    the lane change maneuver includes determining the following by the controller:
        a first lateral distance to the outer boundary of the adjacent lane;
        a maximum steering rate for the current lane, the maximum steering rate includes a maximum rate at which a steering angle of the wheels can be changed without losing traction;
        a second lateral distance, within the maximum steering rate, that the vehicle must move to avoid the leading obstacle;
        an adequate front distance between the vehicle and the leading obstacle for changing lanes based on the determined second lateral distance and the maximum steering rate;
    a lane change to avoid the leading obstacle is available if actual distance between the vehicle and the leading obstacle is not less than the adequate distance because there is adequate room between the vehicle and the leading obstacle and the first lateral distance to the outer boundary of the adjacent lane is adequate to accommodate the vehicle; and
    a lane change to avoid the leading vehicle is not available if actual distance between the vehicle and the leading obstacle is less than the adequate distance because there is inadequate room between the vehicle and the leading obstacle for changing lanes.

2. The system of claim 1, wherein the control module is configured to calculate the steering profile using a value representative of a coefficient of friction between a pair of wheels of the vehicle and the current lane.

3. The system of claim 2, wherein the control module is configured to calculate the steering profile using a value representative of a coefficient of friction between the pair of wheels and the adjacent lane.

4. The system of claim 1, wherein the control module is configured to control a brake system to selectively decelerate the vehicle.

5. The system of claim 1, wherein the at least one sensor is configured to detect a leading adjacent obstacle in the adjacent lane and ahead of the vehicle, and a trailing adjacent obstacle in the adjacent lane and behind the vehicle, wherein the control module is configured to calculate the steering profile based on a relative velocity of the vehicle and at least one of the leading adjacent obstacle and the trailing adjacent obstacle, and wherein the control module is configured to calculate the steering profile based on a distance between the vehicle and at least one of the leading adjacent obstacle and the trailing adjacent obstacle.

6. The system of claim 1, further comprising a database configured to provide pre-programmed data to the control module, wherein the control module is configured to calculate the steering profile based on the pre-programmed data from the database.

7. The system of claim 1, wherein the at least one sensor is configured to detect an object in an adjacent lane, and the control module is configured to only execute the lane change maneuver when the lane change maneuver can be completed without the object in the adjacent lane becoming closer than a safe distance to the vehicle.

8. An active steering system for controlling a vehicle, the system comprising:
    at least one sensor configured to detect a leading obstacle and an adjacent obstacle; and
    a control module configured to receive a signal from the at least one sensor, to calculate a steering profile, and to execute a lane change maneuver based on the steering profile;
    wherein:
    the steering profile includes a plurality of steering angles and corresponding vehicle positions for maneuvering the vehicle from a current lane to an adjacent lane, the steering angles being calculated by the control module to not increase the acceleration of the vehicle above an occupant comfort threshold value and to not cause the vehicle to cross an outer boundary of the adjacent lane;

the steering profile is calculated based on at least one of: a relative distance and velocity of the vehicle and the leading obstacle; and a relative distance and velocity of the vehicle and the adjacent obstacle;

the control module is configured to compare an available deceleration rate of the vehicle with a required deceleration rate of the vehicle that is required to avoid the leading obstacle;

if the available deceleration rate of the vehicle is greater than the required deceleration rate of the vehicle, the control module determines that no lane change maneuver is required to avoid the leading obstacle;

if the available deceleration rate of the vehicle is less than the required deceleration rate of the vehicle, the control module determines that the lane change maneuver is required to avoid the leading obstacle;

the lane change maneuver includes determining the following by the controller:
- a first lateral distance to the outer boundary of the adjacent lane;
- a maximum steering rate for the current lane, the maximum steering rate includes a maximum rate at which a steering angle of the wheels can be changed without losing traction;
- a second lateral distance, within the maximum steering rate, that the vehicle must move to avoid the leading obstacle;
- an adequate front distance between the vehicle and the leading obstacle for changing lanes based on the determined second lateral distance and the maximum steering rate;
- a lane change to avoid the leading obstacle is available if actual distance between the vehicle and the leading obstacle is not less than the adequate distance because there is adequate room between the vehicle and the leading obstacle and the first lateral distance to the outer boundary of the adjacent lane is adequate to accommodate the vehicle; and
- a lane change to avoid the leading vehicle is not available if actual distance between the vehicle and the leading obstacle is less than the adequate distance because there is inadequate room between the vehicle and the leading obstacle for changing lanes.

9. The system of claim 8, wherein the control module is configured to control a brake system to selectively decelerate the vehicle.

10. The system of claim 8, wherein the control module is configured to calculate the steering profile using at least one value representative of a coefficient of friction between a pair of wheels of the vehicle and the current lane, the adjacent lane, or both the current lane and the adjacent lane.

11. The system of claim 8, further comprising a database configured to provide pre-programmed data to the control module, wherein the control module is configured to calculate the steering profile based on the pre-programmed data from the database.

* * * * *